(12) United States Patent
Hirota

(10) Patent No.: US 7,047,763 B2
(45) Date of Patent: May 23, 2006

(54) CONSTANT DIFFERENTIAL PRESSURE VALVE

(75) Inventor: Hisatoshi Hirota, Tokyo (JP)

(73) Assignee: TGK Co., Ltd., Tokyo (JP)

( * ) Notice: Subject to any disclaimer, the term of this patent is extended or adjusted under 35 U.S.C. 154(b) by 158 days.

(21) Appl. No.: 10/935,284

(22) Filed: Sep. 8, 2004

(65) Prior Publication Data

US 2005/0056050 A1    Mar. 17, 2005

(30) Foreign Application Priority Data

Sep. 12, 2003   (JP)   .............................. 2003-320508

(51) Int. Cl.
*F25B 41/06*  (2006.01)

(52) U.S. Cl. .................................... 62/527; 251/129.15

(58) Field of Classification Search .................. 62/527, 62/222, 217; 137/522; 251/129.15, 192.21
See application file for complete search history.

(56) References Cited

U.S. PATENT DOCUMENTS

| | | | |
|---|---|---|---|
| 4,638,973 A | | 1/1987 | Torrence |
| 5,487,407 A | * | 1/1996 | Eaker ......................... 137/522 |
| 5,526,837 A | * | 6/1996 | Eaker ............................ 137/1 |
| 6,182,457 B1 | | 2/2001 | Enderle |
| 6,367,283 B1 | | 4/2002 | Enderle |

FOREIGN PATENT DOCUMENTS

| | | |
|---|---|---|
| JP | 04272589 | 9/1992 |
| JP | 10089523 | 4/1998 |
| JP | 11-316068 | 11/1999 |
| JP | 20011273039 | 10/2001 |

OTHER PUBLICATIONS

Communication dated Feb. 15, 2005 from the European Patent Office in Application No. EP04021619 enclosing European Search Report.

* cited by examiner

*Primary Examiner*—Melvin Jones
(74) *Attorney, Agent, or Firm*—Westerman, Hattori, Daniels & Adrian, LLP

(57) ABSTRACT

To provide a constant differential pressure valve which is compact in size and can be realized at low cost.

In the constant differential pressure valve according to the present invention, a pipe forming a body thereof not only accommodates internal structures, such as a differential pressure control mechanism, a movable core, and a fixed core, but also serves as part of piping of a refrigeration cycle. Further, a solenoid section including a solenoid coil is disposed outside the pipe in a manner surrounding the same. Therefore, substantial integration of the differential pressure control mechanism into the piping of the refrigeration cycle can be achieved, which makes the entire constant differential pressure valve very simple in construction. As a result, reduction of the size of the constant differential pressure valve and resultant reduction of material costs and manufacturing costs can be achieved, which makes it possible to achieve low costs of the constant differential pressure valve.

3 Claims, 3 Drawing Sheets

CONSTANT DIFFERENTIAL PRESSURE VALVE

CROSS-REFERENCES TO RELATED APPLICATIONS, IF ANY:

This application claims priority of Japanese Patent Application No. 2003-320508 filed on Sep. 12, 2003, entitled "CONSTANT DIFFERENTIAL PRESSURE VALVE".

BACKGROUND OF THE INVENTION (1) Field of the Invention

The present invention relates to a constant differential pressure valve disposed in a passage of refrigerant circulating through a refrigeration cycle, for controlling the flow rate of the refrigerant according to the amount of an electric current supplied to the valve, such that a differential pressure of the refrigerant across the valve is held constant.

(2) Description of the Related Art

Conventionally, in a refrigeration cycle e.g. for an automotive air conditioner, a high-temperature, high-pressure gaseous refrigerant compressed by a compressor is condensed or cooled by a condenser or a gas cooler, and then the condensed or cooled refrigerant is changed into a low-temperature, low-pressure refrigerant by a decompression device. Further, the low-temperature refrigerant is evaporated by an evaporator, and the evaporated refrigerant is separated into gas and liquid by an accumulator, followed by the separated gaseous refrigerant being returned to the compressor. A decompression device employed in a refrigeration system of the above-mentioned type can be implemented by a constant differential pressure valve that electrically controls the differential pressure of the refrigerant across the valve (see e.g. Japanese Unexamined Patent Publication (Kokai) No. H11-316068).

A constant differential pressure valve of the above-mentioned kind is formed by integrating a differential pressure control mechanism into a body block formed separately from piping constituting a refrigerant passage of a refrigeration cycle, and has separately connected thereto a pipe for introducing a high-pressure refrigerant and a pipe for delivering decompressed refrigerant downstream toward an evaporator, which are separate from each other. An internal valve element is operated by supplying a predetermined electric current to a solenoid, to thereby control the flow rate of refrigerant such that the differential pressure of the refrigerant across the constant differential pressure valve is held constant.

However, this arrangement causes an increase in the size of the entire constant differential pressure valve because the body block is formed separately from the piping of the refrigeration cycle, and further, an internal refrigerant passage where internal structures of the differential pressure control mechanism, such as the valve element, are arranged, and a solenoid section for drivingly controlling the internal structures are disposed in the body block separately from each other. Further, it is necessary to perform complicated adjustment for arranging respective pipes of refrigerant inlet and outlet passages and the internal refrigerant passage connecting the pipes, according to the construction of the differential pressure control mechanism within the body block, which causes an increase in the manufacturing costs of the constant differential pressure valve.

SUMMARY OF THE INVENTION

The present invention has been made in view of these points, and an object thereof is to provide a constant differential pressure valve which is compact in size and realized at low cost.

To solve the above problem, the present invention provides a constant differential pressure valve provided in a flow passage of refrigerant circulating through a refrigeration cycle, for controlling a flow rate of the refrigerant such that a differential pressure of the refrigerant across the constant differential pressure valve is held at a constant level set by a value of an electric current supplied to a solenoid coil thereof, the constant differential pressure valve comprising a pipe forming a part of the refrigerant flow passage, a fixed core in the form of a hollow cylinder fixed in the pipe, a movable core in the form of a hollow cylinder disposed in the pipe in a manner opposed to the fixed core in an axial direction such that the movable core is movable in the axial direction, the solenoid coil circumferentially disposed outside the pipe in a manner surrounding the pipe, for generating a magnetic circuit including the movable core and the fixed core by an electric current which is externally supplied, to generate an electromagnetic force a magnitude of which corresponds to a value of the supplied electric current to thereby move the movable core to a predetermined reference position with respect to the fixed core, and a differential pressure control mechanism provided in the pipe, for performing valve-opening or valve-closing operation while moving the movable core to and from the predetermined reference position to adjust an internal passage cross-section, to thereby control the flow rate of the refrigerant such that the differential pressure of the refrigerant across the valve is held at the constant level.

The above and other objects, features and advantages of the present invention will become apparent from the following description when taken in conjunction with the accompanying drawings which illustrate preferred embodiment of the present invention by way of example.

DESCRIPTION OF THE PREFFERED EMBODIMENTS

Figure 1:
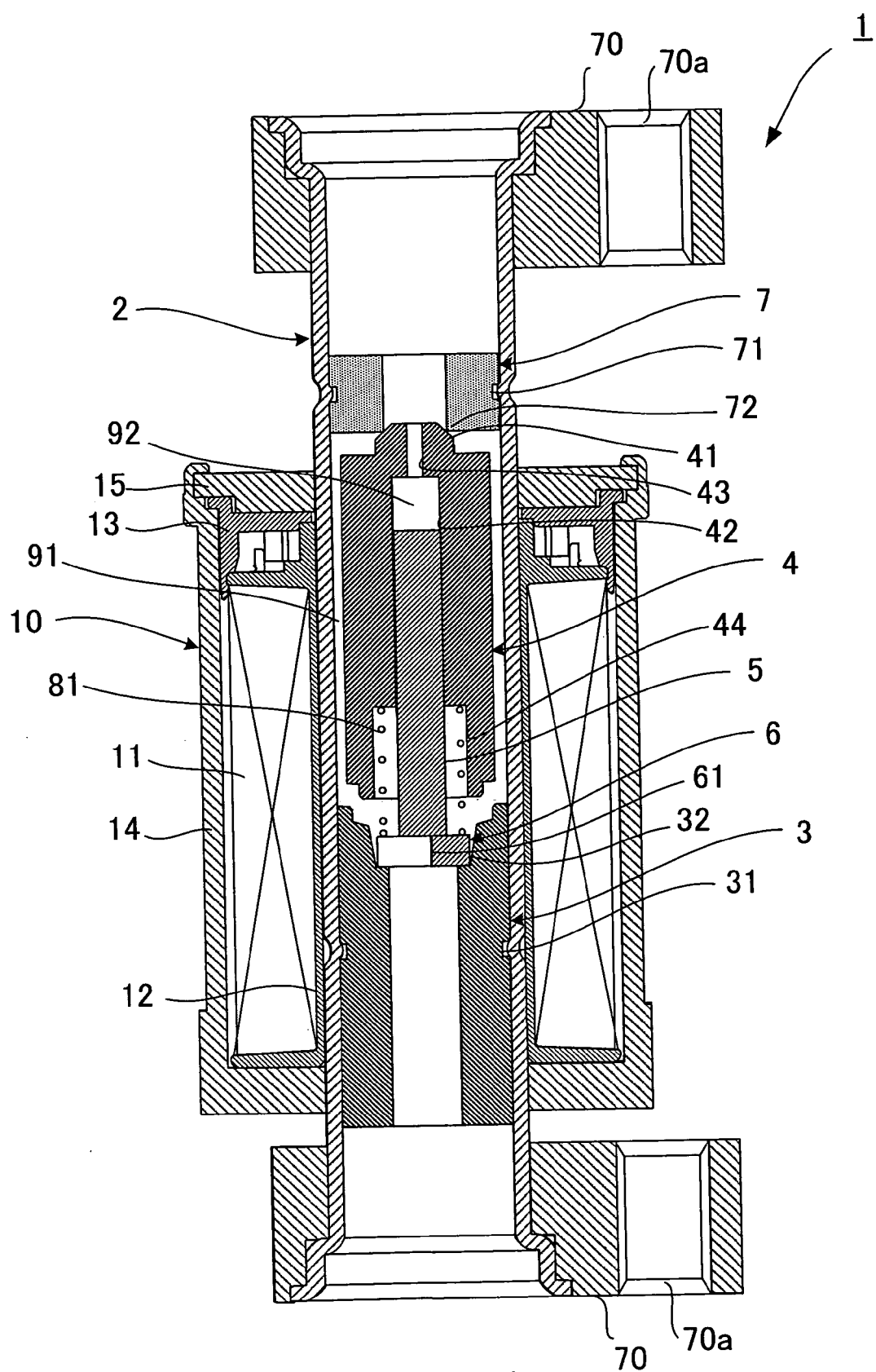
FIG. 1 is a cross-sectional view of a constant differential pressure valve according to an embodiment of the invention.

Hereinafter, an embodiment of the present invention will be described in detail with reference to the drawings. FIG. 1 is a cross-sectional view of a constant differential pressure valve of the present embodiment. In the following description, an upper side and a lower side as viewed in the figure will be also referred to as the upstream side and the downstream side, respectively, with reference to the direction of flow of refrigerant.

As shown in FIG. 1, the constant differential pressure valve 1 is comprised of a body formed by a pipe 2 in the form of a hollow cylinder which both ends are opening, a fixed core 3, a movable core 4, a solid shaft 5, a stopper 6, and a hollow cylindrical member 7, accommodated in the pipe 2, and a solenoid section 10 disposed on the outer periphery of the pipe 2 in a manner surrounding the same.

Piping joints 70 having a generally oval shape are attached to respective both ends of the pipe 2. Each of the ends of the pipe 2 has its diameter increased after the piping joint 70 having been fitted on the pipe 2, so as to prevent the piping joint 70 from falling off. Further, the piping joint 70 is formed with a through hole 70a through which a bolt extends at a location outward of the pipe 2.

To connect the constant differential pressure valve 1 to the piping, not shown, of a refrigeration cycle, not shown, piping joints identical in structure to the piping joint 70 are fitted on opposed pipes of the piping of the refrigeration cycle, and each pair of associated piping joints are faced to each other via an O ring, and then fixed to each other by inserting a bolt through the through holes of the two piping joints and tightening a nut. When the constant differential pressure valve 1 is connected to the refrigeration cycle, the pipe 2 forms a part of a refrigerant passage thereof.

The fixed core 3 has a body in the form of a hollow cylinder, which has a fitting groove 31 circumferentially formed in an outer peripheral surface thereof at the center in the axial direction, and an upstream end of the fixed core 3 has the inner diameter thereof increased by a predetermined amount to accommodate and fix the stopper 6, referred to hereinafter, therein. The fixing of the fixed core 3 in the pipe 2 is attained by accommodating the fixed core 3 in the pipe 2, and then swaging a portion of the pipe 2 corresponding to the fitting groove 31 from the outside to fit the same in the fitting groove 31.

The movable core 4 has a body in the form of a bottomed hollow cylinder which is bottomed on the upstream side, and is disposed within the pipe 2 at a location upstream of the fixed core 3. A valve portion 41 having a tapered shape in which the outer diameter thereof is progressively reduced upstream is formed on the upstream end of the movable core 4 in a manner protruding therefrom. Further, a communication hole 43 axially extends through the valve portion 41, for introducing refrigerant into a bore part 42 within the movable core 4. The movable core 4 is fitted on the solid shaft 5 rigidly secured in the pipe, such that the movable core 4 is axially movable to and from the fixed core 3 while being guided by the solid shaft 5.

Further, the movable core 4 has the inner diameter of a downstream end thereof increased by a predetermined amount to form a chamber 44 for accommodating a spring 81, referred to hereinafter. Between the movable core 4 and the inner wall of the pipe 2, there is formed a clearance passage 91 which allows passage of the refrigerant flowing in from the upstream side.

The solid shaft 5 has a body in the form of a column having an outer diameter approximately equal to the inner diameter of the bore part 42 of the movable core 4, and the downstream end of the solid shaft 5 is fixed to the upstream end face of the stopper 6. The upstream end face of the solid shaft 5 and the inner walls of the movable core 4 define an inner space 92 communicating with the communication hole 43.

The stopper 6 having a disk-shaped body is press-fitted into a stepped portion 32 formed in the increased-diameter portion of the fixed core 3. The stopper 6 has a slit 61 axially formed through a one-sided portion thereof to form part of the refrigerant passage through the constant differential valve 1. A spring 81 (elastic member) is interposed between the stopper 6 and the downstream facing wall of the chamber 44 of the movable core 4 such that the movable core 4 is supported by the fixed core 3 when no electric current is supplied to the solenoid section 10.

The hollow cylindrical member 7 has a body in the form of a hollow cylinder and is disposed in the pipe 2 at a location upstream of the movable core 4. The hollow cylindrical member 7 has a fitting groove 71 circumferentially formed in an outer peripheral surface thereof at the center in the axial direction, and the fixing of the hollow cylindrical part 7 in the pipe 2 is attained by swaging a portion of the pipe 2 corresponding to the fitting groove 71 from the outside to fixedly fit the same in the fitting groove 71. The rim of an opening in a downstream end of the hollow cylindrical member 7 forms a valve seat 72 on which the valve portion 41 of the movable core 4 is seated.

The solenoid section 10 is formed to have a generally hollow cylindrical shape, and disposed in a manner surrounding the pipe 2 from the outside. More specifically, a first bobbin 12 having a solenoid coil 11 wound therearound is disposed around the outer periphery of the pipe 2, and on the upstream end of the first bobbin 12, there is disposed a second bobbin 13 which cooperates with the first bobbin 12 to form a passage for lead wires to the terminals of the solenoid coil 11. The first bobbin 12 and the second bobbin 13 are enclosed by a first yoke 14, and the upstream end of the first yoke 14 is closed by a second yoke 15, whereby a continuous magnetic circuit is formed.

In the constant differential pressure valve 1, the fixed core 3, the movable core 4, the first yoke 14, and the second yoke 15 form the magnetic circuit including the solenoid coil 11.

Next, a description will be given of the operation of the constant differential pressure valve 1. FIG. 1 shows the constant differential pressure valve 1 in a state of the solenoid coil 11 being deenergized, while FIG. 2 shows the same in a state of the solenoid coil 11 being energized.

First, in a state of no electric current being supplied to the solenoid coil 11, the movable core 4 is urged towards the upstream side by the spring 81, and no attractive force is generated between the movable core 4 and the fixed core 3, so that, as shown in FIG. 1, the valve portion 41 is seated on the valve seat 72 to hold the constant differential pressure valve 1 in a fully-closed state.

Figure 2:
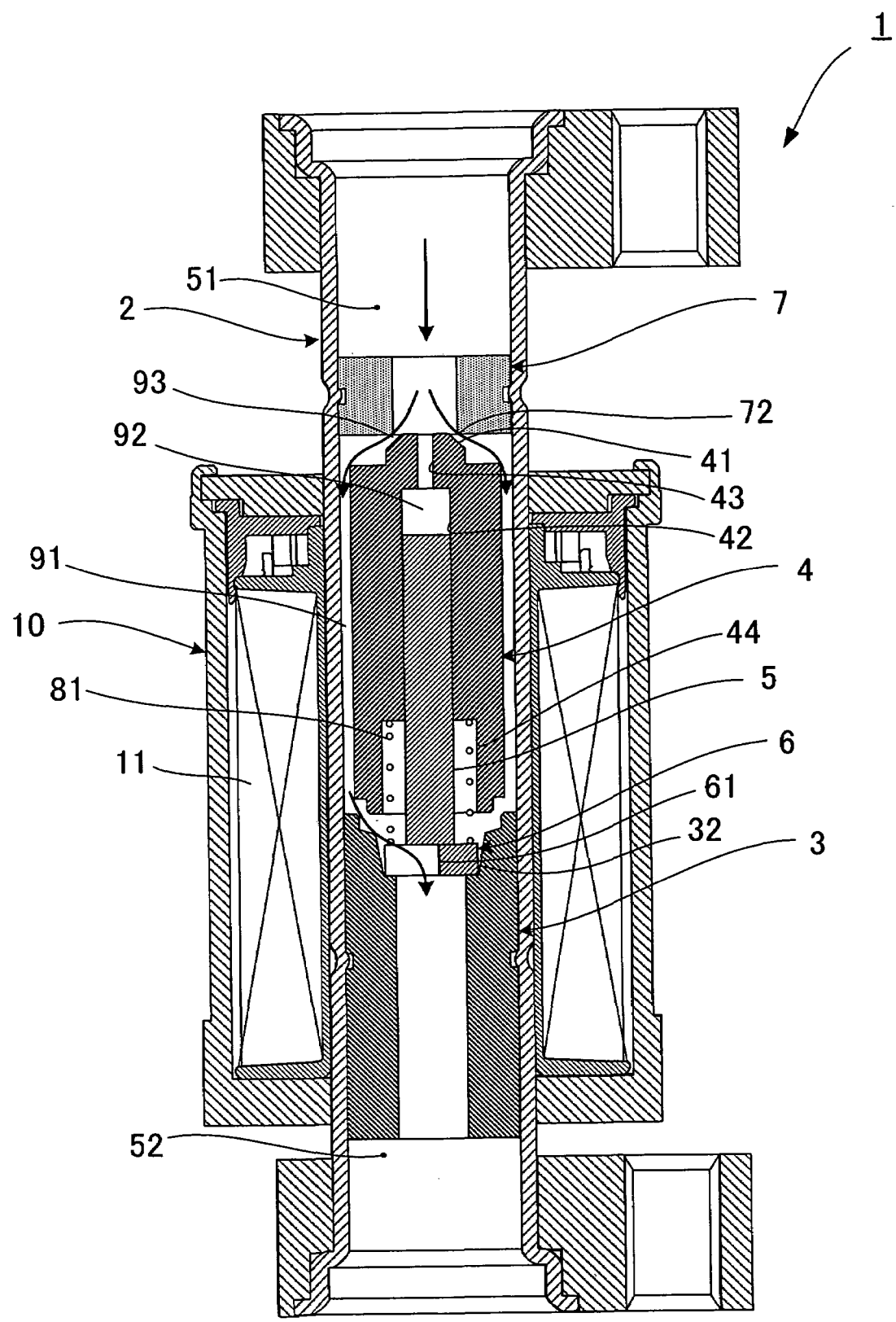
FIG. 2 is a cross-sectional view of the constant differential pressure valve shown in FIG. 1.

Then, when an electric current i is supplied to the solenoid coil 11, an electromagnetic force the magnitude of which corresponds to the value of the electric current i is generated, whereby the movable core 4 is attracted toward the fixed core 3, as shown in FIG. 2. As a result, the valve portion 41 is moved away from the valve seat 72, and held in a position where the electromagnetic force and the load of the spring 81 are balanced with each other, whereby a predetermined passage cross-section is formed between the valve portion 41 and the valve seat 72.

When a high-pressure refrigerant is introduced from the upstream side in the above-described state, the refrigerant is adiabatically expanded by flowing through a refrigerant passage 93 between the valve portion 41 and the valve seat 72, and then further flows downstream through the clearance passage 91 and the slit 61.

At this time, part of the refrigerant introduced from the upstream inlet is also introduced into the inner space 92 via the communication hole 43. Therefore, the inlet pressure of the refrigerant and the pressure in the inner space 92 become equal to each other, and hence part of refrigerant pressure applied to the valve portion 41 and hence to the movable core 4 is canceled.

Now, let it be assumed that the pressure of the refrigerant introduced into a refrigerant inlet 51 is represented by P1, the outlet pressure, which has been reduced due to passage of the refrigerant through the refrigerant passage 93, by P2, and an effective pressure-receiving area of the valve portion 41 in a seated state (i.e. the passage cross-section of the hollow cylindrical member 7) by A, the cross-sectional area of the inner space 92 by B, the electromagnetic force generated by the current i by f(i), and the load of the spring 81, which acts in the upstream direction by fs, the relationship between the upward and downward forces is represented by the following equation:

$$(A-B)(P1-P2)=fs-f(i) \quad (1)$$

Therefore, the differential pressure (P1–P2) across the constant differential pressure valve 1 is represented by the following equation:

$$P1-P2=(fs-f(i))/(A-B) \quad (2)$$

In the right side of the equation (2), the parameters except the electromagnetic force f (i) are substantially fixed values, and therefore the differential pressure (P1–P2) is held at a constant value proportional to the electric current i supplied to the solenoid coil 11.

Figure 3:
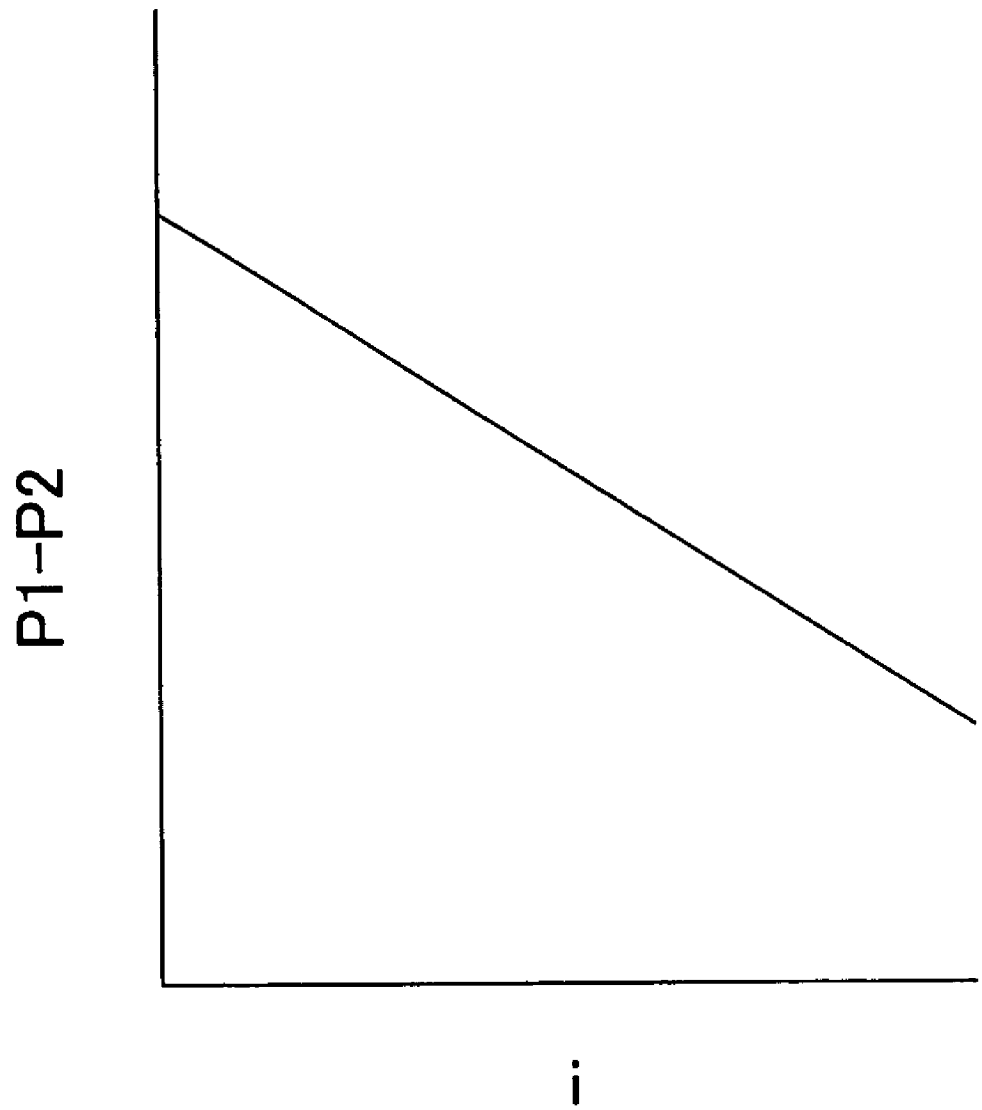
FIG. 3 is a diagram of a differential pressure characteristic of the constant differential pressure valve shown in FIG. 2.

Next, the operation of the constant differential pressure valve 1 will be described based on a differential pressure characteristic shown in FIG. 3. In FIG. 3, the abscissa represents the value of the electric current i supplied to the solenoid coil 11, and the ordinate represents the differential pressure (P1–P2) across the constant differential pressure valve 1.

When the electric current i supplied to the solenoid coil 11 is equal to zero, the constant differential pressure valve 1 is fully closed with the valve portion 41 seated on the valve seat 72 by the spring load fs, and hence the differential pressure (P1–P2) across the valve 1 is held at the maximum.

Then, when the electric current i is supplied to the solenoid coil 11 to apply the electromagnetic force f(i) to the movable core 4, the valve portion 41 is immediately moved from the seated position to the position where the electromagnetic force f(i) and the spring load fs are balanced with each other, and is stopped there. When the valve portion 41 is moved away from the valve seat 72, refrigerant flows at a flow rate which holds the differential pressure constant.

At this time, if a refrigerant flow rate on the upstream side of the constant differential pressure valve 1 in the refrigeration cycle increases to raise the inlet pressure P1 at the refrigerant inlet 51, the valve portion 41 is moved in the valve-opening direction to increase the flow rate of the refrigerant such that its effective pressure-receiving area is increased, thereby holding the differential pressure (P1–P2) constant. On the other hand, if the refrigerant flow rate on the upstream side of the constant differential pressure valve 1 in the refrigeration cycle decreases to lower the inlet pressure P1 at the refrigerant inlet 51, the valve portion 41 is moved in the valve-closing direction to reduce the flow rate of the refrigerant such that the effective pressure-receiving area is decreased, thereby holding the differential pressure (P1–P2) constant. Thus, the differential pressure (P1–P2) across the constant differential pressure valve 1 is always held at a constant value determined by the electric current i.

As described above, in the constant differential pressure valve 1 of the present embodiment, the pipe 2 forming the body of the valve 1 not only accommodates the internal structures, such as the differential pressure control mechanism, the movable core 4, and the fixed core 3, but also serves as a part of the piping of the refrigeration cycle. Further, the solenoid section 10 including the solenoid coil 11 is disposed outside the pipe 2 in a manner surrounding the same. Therefore, substantial integration of the differential pressure control mechanism into the piping of the refrigeration cycle can be achieved, which makes it possible to make the entire constant differential pressure valve 1 very simple in construction. As a result, reduction of the size of the constant differential pressure valve 1 and resultant reduction of material costs and manufacturing costs can be achieved, which makes it possible to achieve low costs of the constant differential pressure valve 1.

Although the preferred embodiments of the present invention have been described heretofore, the present invention is by no means limited to any specific one of the above-described embodiments, but various modifications and alterations can be made thereto without departing the spirit and scope of the present invention.

The invention is applicable to any constant differential pressure valve which is disposed in a passage of refrigerant circulating through the refrigeration cycle, for controlling the flow rate of the refrigerant such that the differential pressure across the valve is held at a set constant level.

According to the constant differential pressure valve of the present invention, the pipe accommodating the internal structures serves as a part of the piping of the refrigeration cycle. Further, the solenoid coil is disposed outside the pipe in a manner surrounding the same. Therefore, substantial integration of the differential pressure control mechanism in the piping of the refrigeration cycle can be achieved, which makes the entire constant differential pressure valve very simple in construction.

Further, differently from the prior art in which an area for installation of a solenoid coil is separately provided, the constant differential pressure valve is thus integrated in the piping of the refrigeration cycle, which enables reduction of an area occupied by the constant differential pressure valve in the refrigeration cycle.

As a result, reduction of the size of the constant differential pressure valve and resultant reduction of material costs and manufacturing costs can be achieved, which makes it possible to achieve low costs of the constant differential pressure valve.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A constant differential pressure valve provided in a flow passage of refrigerant circulating through a refrigeration cycle, for controlling a flow rate of the refrigerant such that a differential pressure of the refrigerant across the constant differential pressure valve is held at a constant level set by a value of an electric current supplied to a solenoid coil thereof, the constant differential pressure valve comprising:

a pipe forming a part of the refrigerant flow passage;

a fixed core in the form of a hollow cylinder fixed in said pipe;

a movable core in the form of a hollow cylinder disposed in said pipe in a manner opposed to said fixed core in an axial direction such that said movable core is movable in the axial direction;

the solenoid coil circumferentially disposed outside said pipe in a manner surrounding said pipe, for generating a magnetic circuit including said movable core and said fixed core by an electric current which is externally supplied, to generate an electromagnetic force a magnitude of which corresponds to a value of the supplied electric current to thereby move said movable core to a predetermined reference position with respect to said fixed core; and a differential pressure control mechanism provided in said pipe, for performing valve-opening or valve-closing operation while moving said movable core to and from the predetermined reference position to adjust an internal passage cross-section, to thereby control the flow rate of the refrigerant such that the differential pressure of the refrigerant across the valve is held at the constant level.

2. The constant differential pressure valve according to claim 1, wherein said differential pressure control mechanism comprises:

a valve seat provided at an end of a fixed passage provided in said pipe; and a valve element formed such that said valve element can be removably seated on said valve seat by motion of said movable core, said valve element allowing the refrigerant to flow downstream through a gap between said valve element and said valve seat when said valve element is open, and wherein a passage cross-section formed between said valve element and said valve seat is adjusted by the motion of said movable core, whereby the differential pressure across the constant differential pressure valve is held at the constant level.

3. The flow-regulating expansion valve according to claim 2, comprising a solid shaft in the form of a column, said solid shaft having said movable core fitted on one end-side part thereof to guide said movable core in directions of motion thereof, an opposite-end side part of said solid shaft being fixed in said pipe, and wherein said movable core has a body in the form of a hollow cylinder having a valve portion of said valve element formed at an extreme end thereof such that said valve portion can be seated on said valve seat, and forming a predetermined clearance passage axially extending between said pipe and said movable core itself, and said movable core further forms, between said solid shaft and said movable core itself, a predetermined inner space for communicating with the fixed passage, the predetermined inner space having a cross-section smaller than the passage cross-section of the fixed passage.

* * * * *